Aug. 5, 1969  P. N. METCALFE  3,459,291
CONVEYOR SUPPORT STRUCTURES
Filed Oct. 10, 1967  5 Sheets-Sheet 1
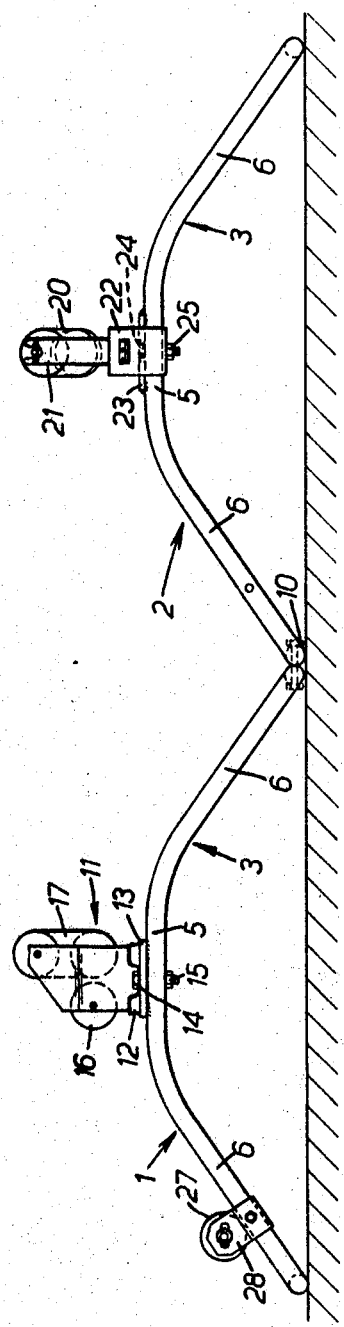
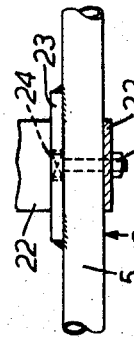
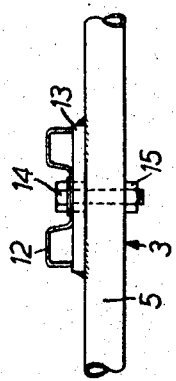

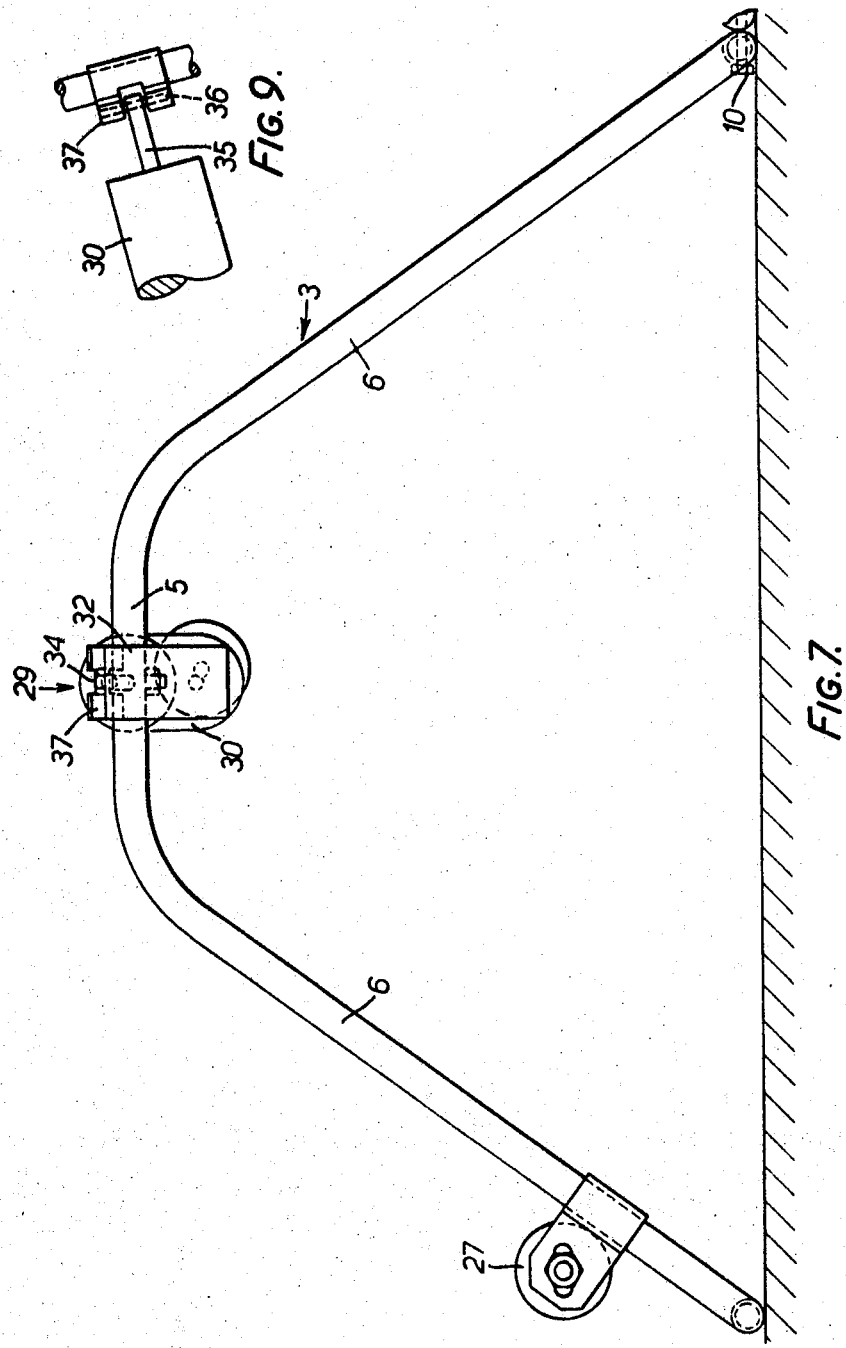

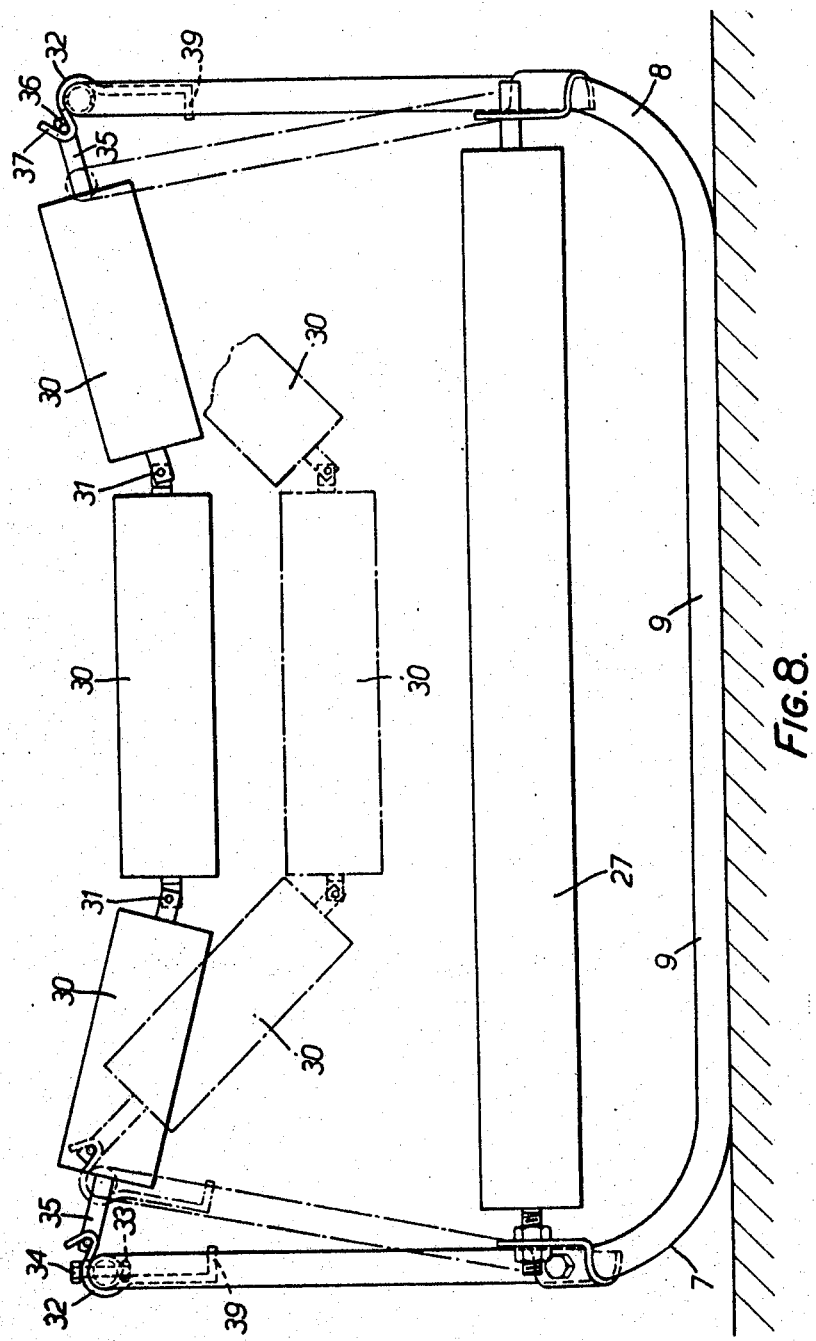

United States Patent Office 3,459,291
Patented Aug. 5, 1969

3,459,291
CONVEYOR SUPPORT STRUCTURES
Peter Newsome Metcalfe, Normanton, England, assignor to Richard Sutcliffe Engineering Systems Limited, Horbury Wakefield, England, a British company
Filed Oct. 10, 1967, Ser. No. 674,273
Int. Cl. B65g 15/08, 15/60
U.S. Cl. 198—192                               7 Claims

ABSTRACT OF THE DISCLOSURE

A conveyor support framework section which has two arch-shaped sides corresponding ends of which are joined by cross-pieces. An idler roller structure bridges the space between the arch-shaped sides and is supported by the roofs of those arches. The roller structure may be a self-troughing structure in which case the arch-shaped sides may be sufficiently resilient to cant towards each other and increase the troughing.

---

A conveyor support structure comprises a plurality of such sections in series so that, in use, the conveyor belt extends between the arch-shaped sides of each section: each section may be a complete unit in which case adjacent cross-pieces of adjacent sections are fixed together; alternatively, adjacent sections may share a common cross-piece.

This invention relates to support structures for conveyors.

In one form of conveyor support structure, idler rollers are suspended between spaced longitudinal members carried by upright stools spaced at intervals along the length of the conveyor. Often, such support structures are assembled on site and the assembly is not always readily accomplished, particularly in closely confined spaces in underground workings, e.g. coal mines, where such conveyors often are employed.

According to the present invention, a conveyor support framework section has two laterally spaced arch-like sides corresponding ends of which are connected by cross-pieces, and an idler roller structure bridging the space between the arch-like sides, and supported by the roof portions of the arches.

Advantageously, the arch-like sides and the cross-pieces together constitute a continuous member.

In one embodiment, the arch-like sides have flat roof portions and divergent leg portions. In plan view, the arch-like sides and cross-pieces define a rectangular closed periphery. However, other arch-like shapes, e.g. arcuate, and other plan view shapes can be used.

The idler roller structure supported by the roof portions of the arch-like sides can be of any desired type, for example fixed angle troughed rollers or so-called self-troughing rollers. The idler roller structure is provided for supporting the forward run of an endless conveyor surface and a roller for the return run can also be suspended between the arch-like sides.

In one embodiment, the framework section carries a self-troughing idler roller structure and the arch-like sides have a degree of resilience sufficient to permit the roof portions of the arches to cant towards each other and thereby increase the troughing of the idler roller structure. The idler roller structure is hooked onto brackets which extend inwardly of and are secured to the roof portions of the arches and the arch-like sides would normally be made of steel of suitable section, dimensions and content specification to provide the degree of resilient flexure necessary for a particular framework.

A conveyor support structure in accordance with the invention includes a plurality of serially-arranged framework sections each having two laterally spaced arch-like sides and an idler roller structure bridging the space between the arch-like sides and supported by the roof portions of the arches, corresponding ends of the pairs of arch-like sides being connected by cross-pieces. Each pair of arch-like sides and the cross-pieces joining their corresponding ends may together constitute a continuous member and the adjacent cross-pieces of adjacent sections may be bolted together.

In an alternative arrangement, the framework sections are not completely formed individually. Instead, adjacent sections share a common cross-piece which can conveniently be secured to the arch-like sides of the sections by T-brackets.

By way of example, the invention will be described in greater detail with reference to the accompanying drawings, in which:

FIG. 1 is a side elevation of two adjacent conveyor support framework sections embodying the invention and carrying different types of idler roller structures;

FIG. 4 shows a detail of FIG. 3;

FIG. 6 shows a detail of FIG. 5;

FIG. 7 is a side elevation of a framework section embodying the invention and carrying a further type of idler roller structure;

FIG. 8 is an end view of FIG. 7;

FIG. 9 is a detail plan view of part of FIG. 8;

Figure 2:
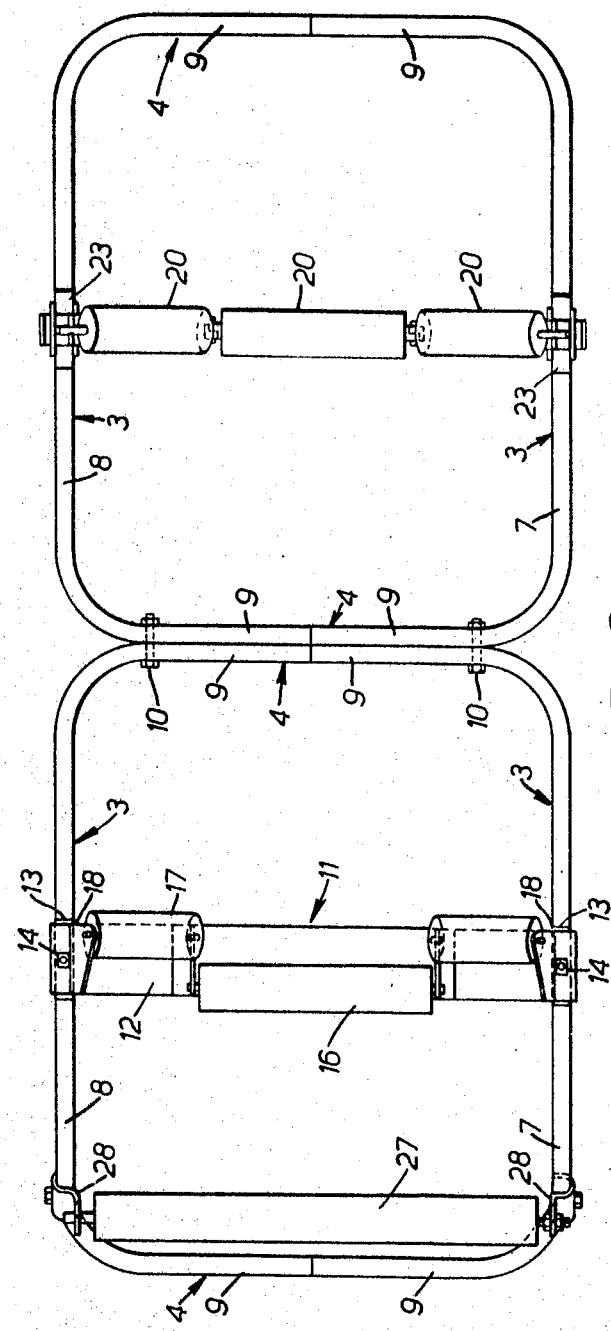
FIG. 2 is a plan view of FIG. 1.

The two framework sections 1, 2 shown in FIGS. 1 and 2 each is in the form of a continuous member so shaped to define, in plan view, a closed generally rectangular periphery, as best seen in FIG. 2. The rectangle has two opposite sides formed as arched portions 3 (best seen in FIG. 1) upstanding from the other two sides which serve as cross-pieces 4 connecting corresponding ends of the side portions 3. The arches 3 each have a flat roof portion 5 and divergent legs 6.

Each of the sections 1, 2 is formed from two tubular-section members 7, 8 each of which is bent to form one of the arched portions 3 with two feet members 9 projecting in the same direction from the divergent legs 6 laterally of the arch. The free ends of the feet members 9 of the member 7 are then butt-welded to corresponding ones of the feet members 9 of the member 8 to form the framework section, as is shown in FIG. 2.

The sections are then disposed end-to-end and the abutting cross-pieces 4 of adjacent sections are secured together by bolts 10. Normally, a complete support structure would have considerably more than two framework sections 1, 2, arranged serially and secured to each other.

For the purposes of illustration only, the framework sections 1 and 2 in FIG. 1 have been shown carrying different types of idler roller structures. Normally, all the framework sections would carry idler roller assemblies of like construction.

The framework section 1 is shown carrying a fixed trough idler roller assembly 11 bridging the space between the arches 3 and supported by the roof portions 5 of the arches. The idler rollers of the assembly are carried by a base 12 which rests on metal plates 13 welded to the roof portions 5 of the sides 3. Bolts 14 which pass through the base 12 at either end thereof and also through the plates 13 and the roof portions 5 have nuts 15 which are tightened to secure the base 12 to the framework section 1. In an alternative arrangement, the plates 13 are omitted and the base 12 is bolted directly onto the roof portions 5. The idler roller assembly has a central idler roller 16 on either side of which are inclined rollers 17, the three rollers being rotatably supported in pairs of upstanding brackets 18 secured to the base 12.

Figure 5:
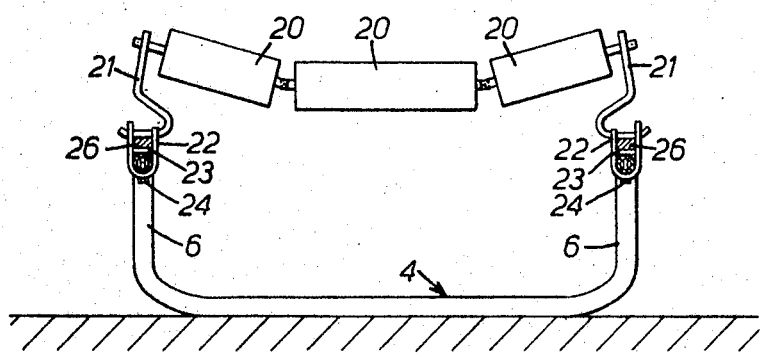
FIG. 5 is an end view of the other one of the sections shown in FIG. 1.

The framework section 2 is shown carrying a self-troughing idler roller assembly including three idler rollers 20 pivotally connected together, the two outer rollers being pivoted from upstanding arms 21 which pass through slots in the legs of U-brackets 22 through which pass the roof portions 5 of the respective arched sides 3, as shown in FIG. 5. Between the legs of the U-brackets 22 are located plates 23 which rest on the roof portions 5 and which receive bolts 24 passing through the roof portions 5 and the arcuate portions of the U-brackets 22. Nuts 25 are threaded on the bolts 24 to secure the U-brackets 22 to the arched sides 3 of the framework section 2. Rubber blocks 26 rest on the plates 23 and support the portions of the arms 21 passing between the legs of the U-brackets 22, providing a resilient support for the idler rollers 20. The arrangement is such that as the loading on the idler rollers increases, the arms 21 pivot inwardly of the arched sides 3 to increase the troughing angle of the idler rollers. This idler roller arrangement is described in more detail in British patent specification No. 920,949.

FIGS. 1 and 2 also show a return idler roller 27 bridging opposite legs 6 of the arched sides 3 of the framework section 1. The roller 27 is rotatably carried by brackets 28 upstanding from and bolted to the legs 6.

Another framework section, also carrying a self-troughing idler roller assembly is shown in FIGS. 7 to 9. The framework section is of similar shape to those shown in FIGS. 1 and 2 and corresponding parts carry corresponding references. Each self-troughing idler roller assembly 29 comprises three idler rollers 30 pivotally connected together by pin joints 31 and suspended from bracket plates 32 extending inwardly of and secured fast to the roof portions 5 of the arched sides 3 of the framework section by nuts and bolts 33, 34. The outer rollers 30 have outwardly extending spindles 35 through the ends of which pass cross-pins 36 which seat in hooked portions 37 of the bracket plates 32. The spindles 35 are thus free to pivot in the brackets 32.

The tubular members 7, 8 forming the arched-sides 3 have a degree of resiliency which permits the arches 3 to cant toward each other in order to accommodate increased troughing of the idler roller assembly from the full-line position towards the chain-line position shown in FIG. 8, such increased troughing resulting from increasing loading of the idler roller assembly. As the loading increases, the centre roller of the assembly tends to be depressed and the angles of inclination of the side rollers increases, resulting in canting of the roof portions 5 of the arches 3 towards each other which can occur due to the resiliency of the tubular members 7, 8 allowing the arches 3 to bend as indicated in FIG. 8.

By suitable choice of material for the tubular members 7, 8, and of the dimensions and cross-sectional shape of those members, the degree of troughing required for the anticipated range of loading of the idler roller assembly can be readily obtained. The construction thus avoids the necessity of using separate spring suspensions to support the idler roller assemblies from the arches 3, as for example is described in British patent specification No. 920,949, and is simple from a manufacturing point of view whilst being effective in operation. A suitable material for the tubular members 7, 8 is high tensile steel from which the remainder of the framework may also be formed.

The bolts 34 pass through slots in the bracket plates 32, permitting movement of the bracket plates along the roof portions 5 to facilitate belt tracking.

The framework section also has a return idler roller 27 bridging opposite legs 6 of the arched sides 3 of the framework section.

Figure 3:
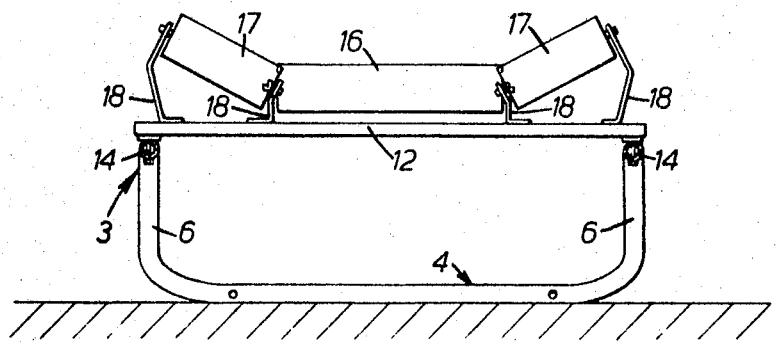
FIG. 3 is an end view of one of the sections shown in FIG. 1.

This framework section, although particularly advantageous when used with a self-troughing idler roller assembly, may also be used with a fixed trough assembly similar to that illustrated in FIG. 3, in which case the support 12 of the assembly is bolted to the lower portion 39 of the bracket plates 32. Thus, this one framework section with the bracket plates 32 may be used to support either self-troughing or fixed trough idler roller assemblies.

Figure 11:
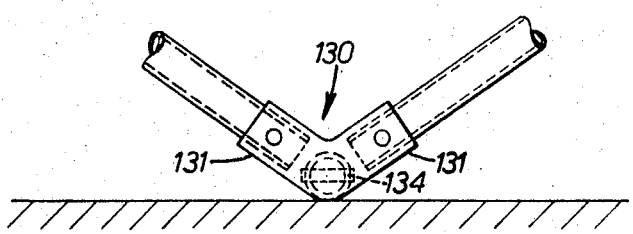
FIGS. 10 and 11 show plan and side views of a detail of a modification of the structure shown in FIGS. 1 and 2.
Figure 10:
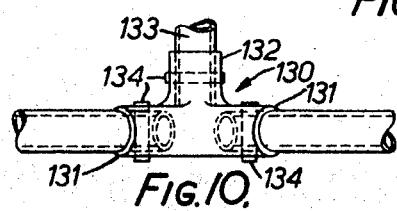

Another form of framework in accordance with the invention is illustrated in FIGS. 10 and 11. In this framework, the sections 1 and 2 are not completely formed individually; instead, the arched sides 3 are formed without the cross-pieces 4 included in the previously described sections and the ends of the sides 3 are received by the arms 131 of a T-bracket 130. In side view, the arms 131 define a shallow V-shape from the apex of which laterally projects a leg 132. One end of a cross-piece 133, common to both sections 1 and 2, is received by the leg 132 of the T-bracket and the other end of the cross-piece 133 is received by the leg of a similar T-bracket on the opposite side of the sections. The arched sides 3 and the cross-pieces 133 are secured in the T-brackets by pins 134.

It will be appreciated that any one of the roller assemblies shown in FIGS. 1 and 7 could be mounted on the framework section shown in FIGS. 10 and 11.

The framework support structures described above are all easy to assemble and to transport. Furthermore, they can conveniently be suspended from an overhead surface, e.g. the roof of an underground working, without the use of any additional parts.

I claim:

1. A conveyor support structure which includes a plurality of serially-arranged framework sections disposed end to end, each section having two arch-like sides spaced apart from each other, laterally of the intended direction of extent of the conveyor relative to the section, an idler roller structure bridging the space between the two arch-like sides and means supporting the idler roller structure from the roof portions of the arches, cross pieces at the ends of the framework sections connecting corresponding ends of the laterally spaced arch-like sides, and connecting means releasably securing adjacent framework sections together.

2. A support structure as claimed in claim 1, in which adjacent framework sections have a common cross-piece.

3. A support structure as claimed in claim 2, in which the said connecting means are T-brackets securing the common cross-piece to the arch-like sides of the adjacent framework sections.

4. A support structure as claimed in claim 1, in which each framework section has two cross-pieces each located at a respective end of the section, and the said connecting means releasably secure adjacent cross pieces of adjacent sections together.

5. A support structure as claimed in claim 4, in which each pair of arch-like sides and the cross-pieces joining their corresponding ends together constitute a continuous member.

6. A support structure as claimed in claim 5, in which the said continuous member is formed from two continuous rods each of which constitutes a respective one of the arch-like sides and a part of each cross-piece.

7. A support structure as claimed in claim 1, in which the idler roller structure is a self-troughing roller structure and the arch-like sides are resilient, the degree of resilience being sufficient to permit the roof portions of the arches to cant towards each other and thereby increase the troughing of the roller structure.

References Cited

UNITED STATES PATENTS 3,100,042  8/1963  Lo Presti _____ 198—192

FOREIGN PATENTS 585,536  12/1924  France.

RICHARD E. AEGERTER, Primary Examiner